United States Patent
Harrison et al.

(10) Patent No.: US 11,294,581 B2
(45) Date of Patent: Apr. 5, 2022

(54) SECURE SHARING OF STORAGE RESOURCES

(71) Applicant: Garrison Technology Ltd., London (GB)

(72) Inventors: Henry Harrison, London (GB); David Garfield, Wormley (GB)

(73) Assignee: GARRISON TECHNOLOGY LTD., London (GB)

( * ) Notice: Subject to any disclaimer, the term of this patent is extended or adjusted under 35 U.S.C. 154(b) by 0 days.

(21) Appl. No.: 16/961,488

(22) PCT Filed: Jan. 7, 2019

(86) PCT No.: PCT/EP2019/050262
§ 371 (c)(1),
(2) Date: Jul. 10, 2020

(87) PCT Pub. No.: WO2019/137876
PCT Pub. Date: Jul. 18, 2019

(65) Prior Publication Data
US 2020/0379658 A1    Dec. 3, 2020

(30) Foreign Application Priority Data
Jan. 12, 2018    (GB) ..................... 1800530

(51) Int. Cl.
*G06F 3/06*    (2006.01)

(52) U.S. Cl.
CPC ............ *G06F 3/0622* (2013.01); *G06F 3/064* (2013.01); *G06F 3/067* (2013.01); *G06F 3/0637* (2013.01); *G06F 3/0658* (2013.01); *G06F 3/0665* (2013.01)

(58) Field of Classification Search
CPC ...... G06F 3/0622; G06F 3/0637; G06F 3/064; G06F 3/0658; G06F 3/0665; G06F 3/067; G06F 12/1458

(Continued)

(56) References Cited

U.S. PATENT DOCUMENTS

2012/0102564 A1*   4/2012   Schentrup ........... H04W 12/068
                                                         726/16
2012/0150858 A1    6/2012   Ripberger
(Continued)

FOREIGN PATENT DOCUMENTS

GB    2545010 A    6/2017

OTHER PUBLICATIONS

Richard Sharpe: "What is SMB?", Oct. 8, 2002 (Oct. 8, 2002), XP055566382, Retrieved from the Internet: URL: http://web.archive.org/web/20030207185218/https://www.samba.org/cifs/docs/what-is-smb.html.

(Continued)

*Primary Examiner* — Gary J Portka
(74) *Attorney, Agent, or Firm* — Occhiuti & Rohlicek LLP

(57) ABSTRACT

A computer system 100 that allows a storage facility 500 to be shared by multiple different users of an Infrastructure as a Services (IaaS) system while maintaining security separation between the users is provided. A controller 150 configured for use in the computer system and a corresponding method and computer program are also provided. The computer system 100 comprises a logic block 101 that comprises one or more processing units that execute instructions, the logic block 101 configured to issue requests to read from and write to storage over a first interface 102; and a controller 150 that is configured to implement a communications link to storage 500; implement a communications link 300 to a second computer system 200 and to receive information identifying a current user of the logic block 101 from the second computer system 200; and receive the requests to read from and write to storage from the logic block 101 over the first interface 102, and to complete the requests. The first interface 102 is a dedicated physical (Continued)

interface between the logic block 101 and the controller 150, whereby the controller 150 can determine that communications over the first interface 102 are communications with the logic block 101. The controller 150 is configured to complete the requests to read from and write to storage using one or more storage locations of the storage 500 that the current user of the logic block 101 identified by the second computer system 200 is permitted to use.

21 Claims, 4 Drawing Sheets

(58) Field of Classification Search
USPC ....... 711/150, 152, 163, 164; 726/4, 5, 6, 28
See application file for complete search history.

(56) References Cited

U.S. PATENT DOCUMENTS

2016/0057147 A1* 2/2016 Mureinik .............. G06F 16/245
                                                                    726/4
2016/0188624 A1   6/2016 Ashida et al.

OTHER PUBLICATIONS

European Search and Examination Report dated Jul. 5, 2018 in GB Application No. 1800530.6.

* cited by examiner

SECURE SHARING OF STORAGE RESOURCES

CROSS-REFERENCE TO RELATED APPLICATIONS

This application is a national phase under 35 U.S.C. 371 of International Application No. PCT/EP2019/050262 filed on Jan. 7, 2019, which claims priority to European Application No. 1800530.6 filed on Jan. 12, 2018, the contents of all of which are hereby incorporated by reference in their entirety.

TECHNICAL FIELD

The invention relates to computer systems and methods for securely sharing storage resources that are used by multiple different users.

BACKGROUND

Infrastructure as a Service (IaaS) is offered by various 'cloud' providers such as Amazon® Elastic Compute Cloud®, Microsoft® and Digital Ocean®. With IaaS services, a central pool of physical computing infrastructure is used by multiple independent customers (or 'users') with security separation to ensure that the data and processes of any given customer are isolated from those of any other customer.

This isolation needs to pertain both at any given point in time and at different points in time. This is because computing infrastructure that was used by one customer (customer A) at a first time (T1) might be subsequently used by another customer (customer B) at a later time (T2). It must not be possible for customer B's processes to gain access to customer A's data, or for customer A's processes to persist to time T2 and gain access to customer B's data (or to modify the behaviour of customer B's processes).

Existing IaaS enforces this isolation using a virtualisation layer, or hypervisor layer. Virtualisation technology allows the IaaS provider to define isolated 'virtual machines', each of which may be used by a different customer. In addition to isolating virtual machines from each other at any given point in time, the virtualisation technology is also responsible for providing isolation across points in time, by enforcing that any given virtual machine can access only the data which belongs to the customer who is using that virtual machine at that time.

In some cases, however, the level of isolation provided by virtualisation may be insufficient for the security requirements of the customers. Vulnerabilities in virtualisation technologies (for example, the VENOM vulnerability) might allow a malicious customer to gain access to the data and processes belonging to other customers who are operating virtual machines on the same physical host.

To address some of these concerns, customers may be provided with their own dedicated physical equipment (including processing resources and, potentially, peripherals such as persistent storage), rather than a virtual machine, to provide a stronger level of isolation between customers.

However, while this provides suitable isolation at a point in time, it does not of itself provide isolation across points in time. For example, if dedicated physical equipment P1 is used by customer A at time T1 and then by customer B at time T2, customer A's processes may persist to time T2 and gain access to customer B's data. As another example, if P1 includes persistent storage, customer B will have access to data stored by customer A on the persistent storage. Even if customer A had encrypted their data, it would be possible for customer B to overwrite the encrypted data so that when customer A returned to use P1 at time T3 its data would no longer be available.

Further, customer A may wish to gain access to their data at a time T3 if allocated different physical equipment (P2). In order for this to be possible, customer A's data needs to be stored on some shared storage facility accessible from P1 at time T1 and from P2 at time T3. This might be provided by a network-attached storage (NAS) device which is connected to a network which also connects to P1 and P2. In this case, to achieve suitable isolation between customers, any given physical equipment should only be able to access stored data on the shared storage facility which is owned by the customer to whom the given physical equipment is allocated at that time.

Various approaches exist for seeking to enforce this isolation requirement. For example, storage devices using network storage protocols such as iSCSI or NBD may provide the ability to enforce access controls based on the network identity of the physical equipment which is accessing them. Such protocols are, however, typically comparatively complex, relying on further lower-level protocols such as TCP, IP and Ethernet.

Because of this complexity, support for these protocols will typically be implemented in a manner which contains security vulnerabilities which might be exploited by an attacker. If a customer is sufficiently concerned about security to be unwilling to rely on virtualisation technology, they are unlikely to be content with the level of security provided by such access controls.

UK Patent Application with publication number GB 2545010 describes an IaaS computer system in which customers can be assigned their own dedicated physical logic block at a given point in time, thereby providing isolation between customers at a point in time. To provide isolation across points in time, each logic block is preconfigured to request boot instructions from a specialized storage controller upon power-up or reset of the logic block, and the storage controller is able to power-up and reset the logic blocks using a control connection. By powering up or resetting a logic block using the control connection, the storage controller is able to place each logic block in a state that results from the execution of the boot instructions that it provides. By taking steps to prevent the logic block from writing boot instructions to the storage controller, the known state that results from the execution of the boot instructions is a "known good" state, as software running on the logic block cannot change the boot instructions that it executes upon power-up or reset. In this way, every time a customer is assigned to a logic block, the logic can be powered-up or reset and the customer will know that the logic block begins in this "known good" state.

While the system described in GB 2545010 provides isolation between customers at a point in time and across points in time, and can be implemented in a high assurance manner, it provides customers with limited access to persistent storage. Were each logic block to be provided with its own persistent storage, the level of isolation between customers across points in time would be significantly reduced, and it would also not allow a customer to access their own data if they are allocated a different logic block at a later time. Providing the logic blocks with a shared storage resource solves the latter problem, but in this case one customer may be able to access or overwrite another customer's stored data, reducing the level of isolation between customers at both a given time and across points in time.

SUMMARY OF THE INVENTION

Embodiments described herein allow multiple different customers of an IaaS system to share a storage facility, while providing isolation between the customers at a point in time and across points in time.

The invention is defined in the independent claims to which reference is now directed. Preferred features are set out in the dependent claims.

According to an aspect of the present invention, there is provided a computer system for use in a server system that provides computing resources to multiple different users. The computer system comprises a logic block (which can also be referred to as a processing block) comprising one or more processing units that execute instructions, the logic block configured to issue requests to read from and write to storage over a first interface (which can also be referred to as a first connection). The computer system further comprises a controller configured to implement a communications link to storage; implement a communications link to a second computer system and to receive information identifying a current user of the logic block from the second computer system; and receive the requests to read from and write to storage from the logic block over the first interface, and to complete the requests. The first interface is a dedicated physical interface between the logic block and the controller, whereby the controller can determine that communications over the first interface are communications with the logic block. The controller is configured to complete the requests to read from and write to storage using one or more storage locations of the storage that the current user of the logic block identified by the second computer system is permitted to use.

By providing a dedicated physical interface (i.e. a dedicated physical connection) between the logic block and the controller (that is, a physical point-to-point interface (i.e. a physical point-to-point connection) between the logic block and the controller), the controller is able to completely reliably distinguish between data that is received from the logic block and data that is not received from the logic block. In other words the logic block cannot successfully impersonate a different entity, nor be impersonated by a different entity, because the controller determines that communications are from the logic block based not on the data it receives, but from the physical interface over which it receives the data. This cannot be changed without accessing the physical internals of the system. This is particularly relevant where the computer system comprises a plurality of logic blocks, each having their own dedicated physical interface to the controller, as it means the controller can differentiate between logic blocks in a completely secure, reliable manner.

Further, as the controller receives the identity of the current user of the logic block (that is, the customer that is currently assigned to the logic block) from a second computer system that is completely independent of the logic block, the controller can be completely sure that the logic block cannot influence the determination of the user by the controller. Indeed, to the extent the second computer system is trusted, the controller can be absolutely sure of the identity of the current user.

In combination, this means that when the controller receives requests to read from or write to storage, the controller is able to identify storage locations of a shared storage resource which it can be sure are permissible for use by the source of the requests. In this way, embodiments allow a storage facility to be shared by multiple different users, maintaining a high degree of isolation between users of the logic block.

The controller may be configured, in response to receiving information from the second computer system identifying a subsequent user of the logic block, to complete the requests from the logic block to read from and write to storage using one or more predefined storage locations of the storage that the subsequent user of the logic block is permitted to use. The subsequent user, sometimes referred to herein as a new user, is a different user to the current user, and may be a "new" user in the sense that they are a different user to the current/previous user; for the avoidance of doubt, the subsequent user follows the current/previous user but may have used the logic block before. As instructions regarding a new user of a logic block are received from the second computer system, which is independent of the logic block, the computer system cannot be tricked by software running on the logic block into reading data from or writing data to storage locations which the true current user of the logic block is not permitted to access.

The computer system may further comprise a control connection between the logic block and the controller, with the controller being configured to use the control connection to power-up or reset the logic block. The controller may be configured to power-up or reset the logic block in response to receiving an instruction from the second computer system. Software running on the logic block cannot survive being powered down or reset, so this provides the ability to 'flush' the logic block of software running on the logic block. This may be useful when preparing the logic block for use by a different customer, or if the logic block is believed to be running malware.

The controller may be configured to power-up or reset the logic block in response to receiving an instruction from the second computer system to configure the logic block for use by a subsequent user. Resetting the logic block helps prevent the processes of a previous user of the logic block from affecting the processes and data of the subsequent of the logic bock.

The instruction to configure the logic block for use by a subsequent user may comprise information identifying the subsequent user of the logic block. The controller needs to know the identity of the subsequent user of the logic block if it is to serve requests issued by the subsequent user of the logic block to read data from and write data to storage while maintaining security separation between the different users.

The instruction to configure the logic block for use by a subsequent user may comprise an instruction for the controller to stop communicating requests to read from and write to storage from the logic block to storage, prior to resetting the logic block.

The logic block may be configured, for example logically hardwired, to specify one or more predefined storage locations when it issues requests to read from and write to storage over the first interface. In this case, the controller may be configured to translate the predefined storage location specified by the logic block to a user-specific storage location that the user of the logic block identified by the second computer system is permitted to use, and to complete the requests using the user-specific storage location. In this way, the logic block always specifies the same storage locations, regardless of the user of the logic block, so the user-specific storage locations do not need to be communicated to the logic block. This may simplify the process of switching between users of the logic block. It may also improve security because the logic block, which may become compromised during use, does not know any user-specific storage locations and therefore cannot attempt to communicate them outside of the computer system. Logically hardwiring the logic block to specify the storage locations provides additional security, as the behaviour cannot be changed by software running on the logic block.

The controller may be configured to provide the logic block with user-specific storage locations that the current user of the logic block identified by the second computer system is permitted to use, in which case the logic block can be configured to specify these user-specific storage locations when it issues requests to read from and write to storage. This may reduce the processing requirements and complexity of the controller, as the controller does not need to translate the storage locations it receives from the logic block. In this case, the controller may also be configured to verify that the storage locations specified by the logic block match the user-specific storage locations associated with the current user of the logic block identified by the second computer system. This provides security enforcement, as the logic block may become compromised during use and specify storage locations that the user is not permitted to access.

The logic block may be configured, for example logically hardwired, to request the user-specific storage locations it is permitted to use from the controller upon power-up or reset of the logic block. Integrating this behaviour into the boot sequence of the logic block provides a more robust system.

The controller may comprise a network interface for communicating with a network, and the controller may be configured to send network data received via the network interface to the logic block and to send network data received from the logic block to the network via the network interface. The addition of a network interface to the computer system provides the logic block with additional functionality and provides a single point of security management for both storage and network access.

The controller may be configured to impose predefined user-specific network access rules on the network data sent to and received from the logic block over the first interface according to the current user of the logic block identified by the second computer system. This not only further reduces the risk of the logic block being compromised during use, it allows the exposure of the logic block to external threats to be tailored to the requirements of the user of the logic block, without having to change the configuration of the logic block.

The logic block may be configured to send and receive network data over the first interface. Alternatively, the logic block may be configured to send and receive network data over a second interface (which can also be referred to as a second connection) between the logic block and the controller. Where network data and storage data are sent over the same, first interface, the first and second protocols may be multiplexed over the first interface, for example using time-division multiplexing. Alternatively, the first communication protocol may be tunnelled via the second communication protocol, or the second communication protocol may be tunnelled via the first communication protocol. Where the network data and storage data are sent over separate dedicated physical interfaces, the logic block may be configured to issue the requests to read from and write to storage over the first interface according to a first communication protocol, and the logic block is configured to send and receive network data over the first interface according to a second communication protocol.

Sending network data and storage data over the same interface may reduce the number of physical connections between the controller and logic block, which may in turn save hardware pins for other uses, such as the connection of more logic blocks to the controller. However, sending the network data and storage data over separate physical interfaces is also a possibility.

The storage may comprise network-based storage, and the controller may be configured to complete the requests to read from and write to storage to the network-based storage over the network interface.

The logic block may be configured, for example logically hardwired, to request boot instructions from the controller over the first interface upon power-up or reset of the logic block. The logic block may be logically hardwired using one or more of an ASIC, PLD, or instructions stored in Read Only Memory. The ROM instructions may be stored within the logic block. Preconfiguring the logic block to request boot instructions from the controller upon power-up or reset of the logic block allows the controller to control the starting state of the logic block when the logic block is switched to a new user. It also reduces the risk of a logic block being "bricked" as a result of the logic block making changes to the boot instructions that it executes upon power-up or reset.

The controller may be configured, in response to receiving the request for boot instructions from the logic block, to complete the request using one or more storage locations of the storage that the current user of the logic block identified by the second computer system is permitted to use, in order to provide user-specific boot instructions to the logic block. This allows a given user of the logic block to boot their logic block into a user-specific state. While this state may well be desired by the user, it could also be one that is affected by malware. However, the fact that the controller only ever returns data from user-specific storage locations means that other users are still isolated (both at a given time and across points in time) from the affected state.

Additionally or alternatively, the controller may be configured, in response to receiving the request for boot instructions from the logic block, to provide predefined boot instructions provided by the second computer system to the logic block. This allows the logic block to be booted into a "known good" state that results from the execution of the boot instructions provided by the second computer system, which may be known to be "clean" boot instructions. This can allow for boot instructions to be updated in a secure manner. Further, if a user's own user-specific boot instructions have been compromised in some way, this allows the logic block to be booted into a known good state, at which point the user-specific boot instructions may be repaired.

The logic block may further comprise its own persistent storage. This provides additional functionality to the user of the logic block.

Where the logic block comprises its own persistent storage, and where the computer system comprises a control connection between the logic block and the controller, the controller may be configured, in response to receiving an instruction from the second computer system to configure the logic block for use by a new user by: powering-up or resetting the logic block so that the logic block requests boot instructions from the controller; providing predefined boot instructions provided by the second computer system to the logic block, the predefined boot instructions comprising instructions that cause the logic block to overwrite the logic block's own persistent storage so that the contents of the logic block's own persistent storage are no longer recoverable by the logic block; resetting the logic block so that the logic block requests boot instructions from the controller; and communicating the request to one or more predefined storage locations of the storage that the current user of the logic block identified by the second computer system is permitted to use, in order to provide user-specific boot instructions to the logic block.

While providing the logic block with its own persistent storage provides additional functionality to the users of the computer system, it potentially reduces the isolation between different users across points in time. However, by utilizing the control connection and hardwired boot sequence in this way, the controller is able to ensure that data stored in the logic block's persistent storage by one user cannot be accessed by or affect a subsequent user of the logic block.

Alternatively, rather than resetting the logic block after is has executed the boot instructions which cause it to overwrite its own persistent storage, the boot instructions may comprise a final instruction which causes the logic block to request another set of boot instructions. The controller may then communicate that request to one or more predefined storage locations of the storage that the current user of the logic block identified by the second computer system is permitted to use, in order to provide user-specific boot instructions to the logic block. This approach, in which the controller does not have to reset the logic block a second time, may be simpler to implement.

The logic block may be configured to issue requests to read from and write to storage over the first interface according to a storage protocol, such as eMMC. The use of a simple storage protocol such as eMMC allows the controller to be implemented in a high-assurance manner, for example using an FGPA or ASIC, or using formally verifiable software. This reduces the risk of a compromised logic block being able to compromise the controller using communications over the first interface.

The logic block may have no interfaces to outside of the computer system except via the controller. This ensures that the controller is able to provide security separation between users of the computer system.

The storage locations may be data ranges such as byte ranges or block ranges.

The storage may comprise one or more of: one or more storage media accessible via a network interface of the controller; one or more storage media accessible via the communications link to the management computer system; and one or more storage media within the computer system.

The computer system may further comprise one or more additional logic blocks, each comprising one or more processing units that execute instructions. Each of the additional logic blocks may be configured to issue requests to read from and write to the storage over a respective dedicated physical interface between the respective logic block and the controller, such that the controller can determine with which logic block it is communicating. The controller may be further configured, for the additional logic blocks, to receive information identifying a current user of the respective additional logic block from the second computer system; and receive requests to read from and write to storage from the respective additional logic block and to complete the respective requests using respective predefined storage locations of the storage that the current user of the respective logic block identified by the second computer system is permitted to use.

The computer system may further comprise the second computer system.

The second computer system may be configured to provide the controller with the storage locations that each of a plurality of different users of the computer system are permitted to use.

The second computer system may be configured to provide the controller with user-specific network access rules.

The controller is also separately provided.

A corresponding method of operating a computer system that comprises a controller and a logic block comprising one or more processing units that execute instructions is also provided. The method comprises receiving, by the controller, from a second computer system, information identifying a current user of the logic block; receiving, by the controller, from the logic block, over a first interface, requests to read from and write to storage, the first interface being a dedicated physical interface between the logic block and the controller whereby the controller can determine that communications over the first interface are communications with the logic block; and completing the requests to read from and write to storage using one or more storage locations of the storage that the current user of the logic block identified by the second computer system is permitted to use.

A computer program that, when executed on a controller, causes it to carry out the method is also provided.

BRIEF DESCRIPTION OF THE DRAWINGS

Embodiments of the invention will now be further described by way of example only and with reference to the accompanying figures in which.

Like reference number are used for like elements throughout the description and figures.

DETAILED DESCRIPTION

Figure 1:
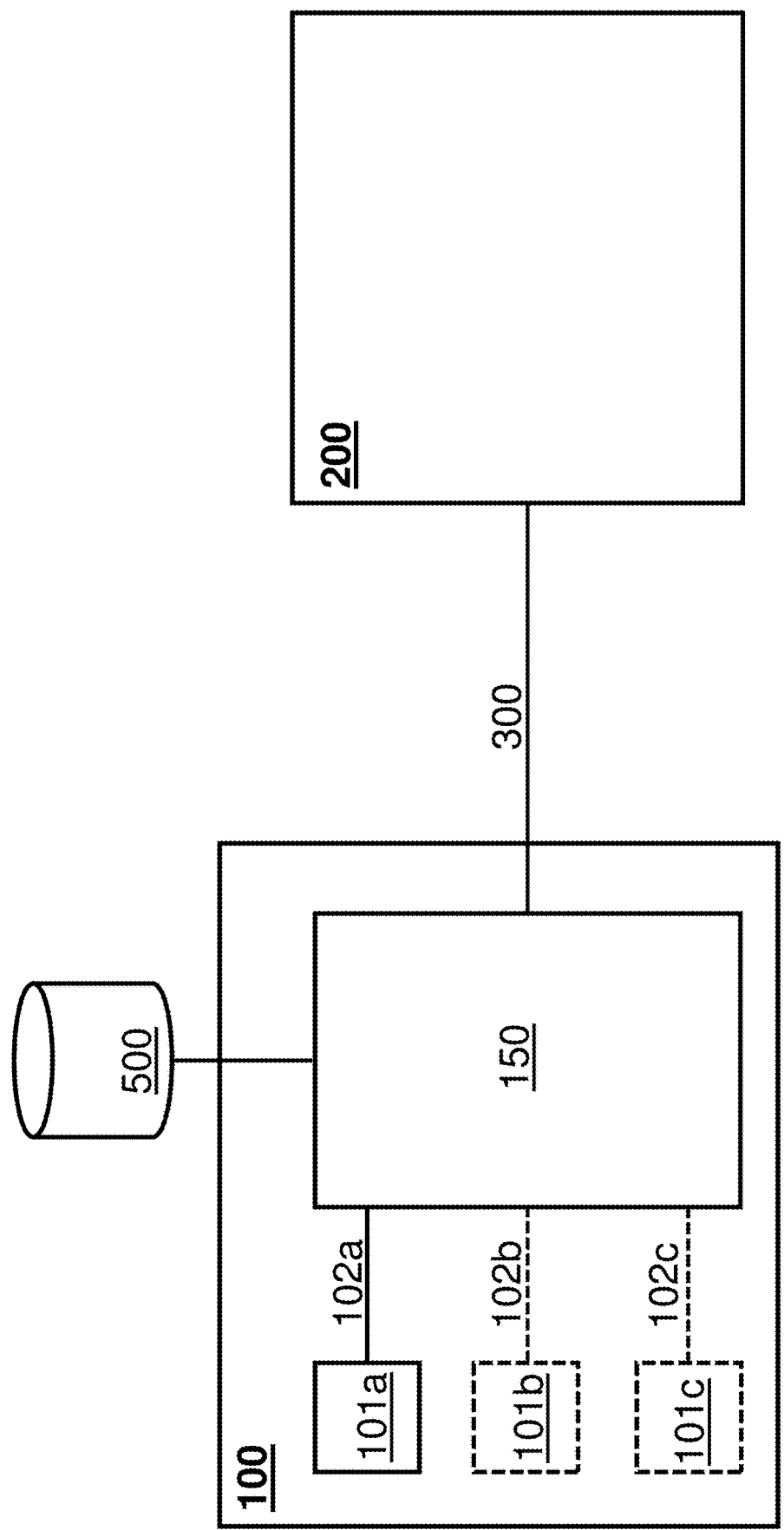
FIG. 1 is schematic diagram of a first and second computer system according to an embodiment.

FIG. 1 shows a first computer system 100 and a second computer system 200. For reference purposes the first computer system will be referred to as an IaaS computer system 100 and the second computer system will be referred to as a management computer system 200.

The IaaS computer system 100 will typically comprise one or more logic blocks 101*a*; 101*b*; 101*c* which each comprise one or more processing units and some RAM (not shown), and a specialised interface controller 150. A logic block 101*a*; 101*b*; 101*c* can also be referred to as a processing block, processing circuitry or logic circuitry, as it performs processing functions. Each logic block 101*a*; 101*b*; 101*c* is connected to the interface controller 150 via its own dedicated, physical, point-to-point interface 102*a*; 102*b*; 102*c*. The term 'interface' is used in this context to refer to the connection between a logic block 101*a*; 101*b*; 101*c* and the interface controller 150. While each of the logic blocks 101a; 101b; 101c may include or have other connections to other dedicated components within the IaaS computer system (such as dedicated persistent storage, as will be described below with reference to FIG. 3), the logic blocks 101a; 101b; 101c do not have any other connections to components that are shared by the logic blocks 101a; 101b; 101c, nor any connections to outside of the IaaS computer system 100, except via the interface controller 150.

The connections between the logic blocks 101a; 101b; 101c and the interface controller 150 are established in such a way that logic blocks 101a; 101b; 101c can issue requests to the interface controller 150 to read from and write to storage using a suitable communication protocol, such as a storage protocol.

The interface controller 150 is able to communicate with the logic blocks 101a; 101b; 101c over their respective dedicated physical interface 102a; 102b; 102c according to the chosen protocol. The interface controller 150 is therefore able to receive the read and write requests issued by the logic blocks 101a; 101b; 101c and, having served the requests in an appropriate manner (as will be explained in more detail below), return data to the logic blocks 101a; 101b; 101c over their dedicated physical interface 102a; 102b; 102c if necessary to complete the requests.

The logic blocks 101a; 101b; 101c and the interface controller 150 may be implemented on separate chip packages, for example Ball Grid Arrays. In this case, a dedicated physical interface between one logic block and the interface controller 150 may be achieved by creating metallic connections on a PCB between the pins of the logic block package and appropriate, dedicated, pins on the interface controller package. Other logic blocks would then be connected to other pins on the interface controller package to achieve their respective dedicated physical interfaces.

Alternatively logic blocks 101a; 101b; 101c and the interface controller 150 may be implemented as separate circuits within a single silicon substrate. In this case a dedicated physical interface between one logic block and the interface controller 150 may be achieved by creating suitable conductive tracks on the substrate, for example using lithography.

Preferably, a very simple storage protocol such as eMMC is chosen for communications between the interface controller 150 and the logic blocks 101a; 101b; 101c over their respective dedicated physical interface 102a; 102b; 102c. Choosing a very simple protocol allows the functionality of the interface controller to be implemented in a high-assurance fashion. This makes it very difficult for malicious parties to use the protocol as a means of compromising the function of the interface controller 150, by using malicious software which may run on the logic blocks 101a; 101b; 101c. An example of a high-assurance approach is the implementation of the interface controller 150 in hardware, for example using an FPGA or ASIC. The functionality of such hardware-based implementations cannot be modified without access to the internals of the device, making them particularly secure. Another example of a high-assurance approach is implementation of the interface controller using software developed using formal methods. While it is possible to use a more complex protocol, this will be more risky, difficult, and expensive to implement in a high-assurance fashion.

The interface controller 150 also implements a communications link 300 to the management computer system 200. This can be achieved in a number of different ways, but what is important is that the communications link 300 is independent of any of the dedicated physical interfaces 102a; 102b; 102c. In this way, the logic blocks 101a; 101b; 101c cannot influence what data is received by the interface controller 150 from the second computer system 200 over the communications link 300.

In some implementations, communications link 300 is a link to a management network 300 of which the management computer system 200 is a part. In other implementations, the second computer system 200 is actually a part of the IaaS computer system 100. Regardless, the communications link 300 between the interface controller 150 and management computer system 200 is independent of any of the dedicated physical interfaces 102a; 102b; 102c between the interface controller 150 and the logic blocks 101a; 101b; 101c.

The communications link 300 may be implemented as a physical wired connection between the IaaS computer system 100 and the management computer system 200, or as a wired and/or wireless network connection. The communications link may be implemented in such a way that communications over this link 300 cannot be accessed by any other components of the IaaS computer system 100. For example, in one implementation, the interface controller 150 contains a physical communications port which is connected via a cable to the management computer system 200. In another implementation, the interface controller 150 implements an encrypted link to the management computer system 200 in such a way that other components of the IaaS boot computer system 100 might be able to access the encrypted traffic but will have no access to the key required to decrypt or encrypt.

The management computer system 200 is typically associated with an operator of the IaaS computer system 100. For example, the management computer system 200 may be responsible for managing the assignment of the use of the logic block(s) 101a; 101b; 101c to customers of the IaaS computer system 100. Alternatively or additionally, this information may be provided to the management computer system 200 or input by an operator or other entity associated with the operator of the IaaS computer system 100. In this way, the management computer system 200 knows the identify of the users of the logic blocks 101a; 101b; 101c at any given time and can communicate this information to the interface controller 150 over the communications link 300.

The interface controller 150 also implements a communications link to storage 500, which allows the interface controller 150 to read data from and write data to the storage 500 in order to serve the requests from the logic blocks 101a; 101b; 101c.

While FIG. 1 shows the storage 500 as being a single storage device outside of both the IaaS computer system 100 and the management computer system 200, it should be appreciated that this is only an example: the precise location of the storage 500 is not important, and the shared storage 500 may take the form of multiple storage devices, possibly at different locations, both inside and outside of the IaaS computer system 100 and management computer system 200. What is important is that the logic blocks 101a; 101b; 101c cannot read or write directly from/to the shared storage 500, and must instead do so via the interface controller 150, by issuing requests over their dedicated physical interfaces 102a; 102b; 102c.

The storage 500 is a shared storage resource in that it serves storage needs of multiple different users of the IaaS computer system 100. It will be understood that the different users may be users of the same logic block at different times and/or users of different logic blocks at the same or different times.

In order to provide security separation between the different users of the IaaS computer system 100, each user has storage locations (e.g. blocks or byte ranges) of the storage 500 which they are permitted to use (i.e. read from and write to) but which no other user is permitted to use. In use, the interface controller 150 has knowledge of the storage locations that the current users of the logic blocks 101a; 101b; 101c (as indicated by the management computer system 200) are permitted to use.

The interface controller 150 may obtain knowledge of these storage locations in a number of different ways. In some implementations, storage locations are preassigned to the different users of the IaaS computer system 100, and the interface controller 150 is preconfigured (by the management computer system 200, for example) so that it knows the storage locations that each of the different users is permitted to use. In other implementations, when the management computer system 200 provides the interface controller 150 with the identity of the current user of a logic block, it also provides the interface controller 150 with the storage locations that the user of the logic block is permitted to use. Additionally, the interface controller 150 may be able to assign previously unassigned storage locations to new or existing users of the IaaS computer system 100.

Further, the interface controller 150 responds to read and write requests it receives from a logic block over its respective dedicated physical interface by only using (i.e. accessing or writing to) the storage locations which the current user of the logic block (as indicated by the management computer system 200) is permitted to use. The precise implementation of this aspect can vary. For example, in some implementations, before a user of a logic block issues any read/write requests, the interface controller 150 provides the logic block with the storage locations (e.g. blocks or byte ranges) that the user of the logic block (as indicated by the management computer system 200) is permitted to use. Subsequently, the interface controller 150 will verify that the storage locations specified by the logic block in the read and write requests correspond to storage locations the user is permitted to use, and will only proxy requests that are verified. In other implementations, each logic block is preconfigured (e.g. logically hardwired) to specify arbitrary (e.g. predefined) storage locations, regardless of the user of the logic block. For example, the logic block may use storage locations that are programmed into a ROM that is within the logic block, or such storage locations may be provided by the logic block's hardwired circuitry. In these embodiments, the interface controller 150 translates the arbitrary storage locations specified in the requests that are issued by the logic block into storage locations that the user of the logic block is permitted to use.

To illustrate the operation of the IaaS system 100 and management computer system 200 described above, an example will now be provided.

At a given time (T1), a customer (customer A) of the IaaS computer system 100 has been assigned a particular logic block (logic block 101a, for example) for use. If the IaaS computer system 100 includes more than one logic block, another customer (customer B) may also have been assigned to another of the logic blocks (logic block 101b, for example) at time T1.

The interface controller 150 receives information from the management computer system 200 that identifies customer A as the current user (at time T1) of logic block 101a. Likewise, the interface controller 150 receives information from the management computer system 200 that identifies customer B as the current user of logic block 101b. Since the communications link 300 between the interface controller 150 and the management computer system 200 is completely independent of the dedicated physical interfaces 102a; 102b between the interface controller 150 and the logic blocks 101a; 101b, the logic blocks 101a; 101b cannot influence the identity information which the interface controller 150 receives from the management computer system 200. The interface controller 150 therefore reliably knows the identity of the current users of the logic blocks 101a; 101b. The management computer system 200 may also identify the storage locations that customer A and customer B are permitted to use. Alternatively, the interface controller 150 may have been preconfigured with the information.

In order to read data from and write data to the shared storage resource 500, customer A's logic block 101a issues read and write requests via the interface controller 150 over the logic block 101a's dedicated physical interface 102a. Likewise, in order to read data from and write data to the shared storage resource 500, customer B's logic block 101b issues read and write requests via the interface controller 150 over the logic block 101b's dedicated physical interface 102b.

The interface controller 150 receives the read and write requests issued by logic block 101a over the dedicated physical interface 102a. Due to the dedicated physical nature of the interface 102a, the interface controller 150 can be absolutely sure that the requests it receives over the interface 102a have been issued by the logic block 101a. In other words, the interface controller 150 bases its determination of the source of the requests on the interface over which it receives the requests, rather than the content of the data it receives. This means that the logic block 101a cannot impersonate another entity (such as logic block 101b), and similarly other entities (such as logic block 101b) cannot impersonate logic block 101a. Likewise, the interface controller 150 receives the read and write requests issued by logic block 101b over the dedicated physical interface 102b. Due to the dedicated physical nature of the interface 102b, the interface controller 150 can be absolutely sure that the requests it receives over the interface 102b have been issued by the logic block 101b.

The interface controller 150 is then able to associate the requests received from the logic block 101a over interface 102a with a user, namely the current user of the logic block 101a as indicated by the management computer system 200: customer A. Likewise, the interface controller 150 is able to associate the requests received from the logic block 101b over interface 102b with a user, namely the current user of the logic block 101b as indicated by the management computer system 200: customer B.

Finally, the interface controller 150 serves the read and write requests issued by customer A. In doing so, the interface controller 150 only uses (read from/writes to) storage locations of the shared storage 500 that customer A is permitted to use, and will never read from or write to storage locations of the shared storage which customer A is not permitted to use. Likewise, the interface controller 150 serves the read and write requests issued by customer B, using only storage locations of the shared storage 500 that customer B is permitted to use. In this way, IaaS computer system 100 allows multiple different customers of the IaaS computer system 100 to share a storage resource 500, but maintains isolation between the different customers.

At a later time, T2, the interface controller 150 receives information from the management computer system 200 which identifies a new user, customer C, of logic block 101*a*. The interface controller 150 will therefore respond to subsequent read and write requests that are issued by the logic block 101*a* by only using storage locations of the shared storage 500 that customer C is permitted to use. In other words, when the current user of a logic block of the IaaS computer system changes from Customer A to Customer C, the interface controller 150 will stop proxying read/write requests to storage locations which Customer A is permitted to use, and will instead proxy read/write requests to storage locations which customer C is permitted to use.

Figure 2:
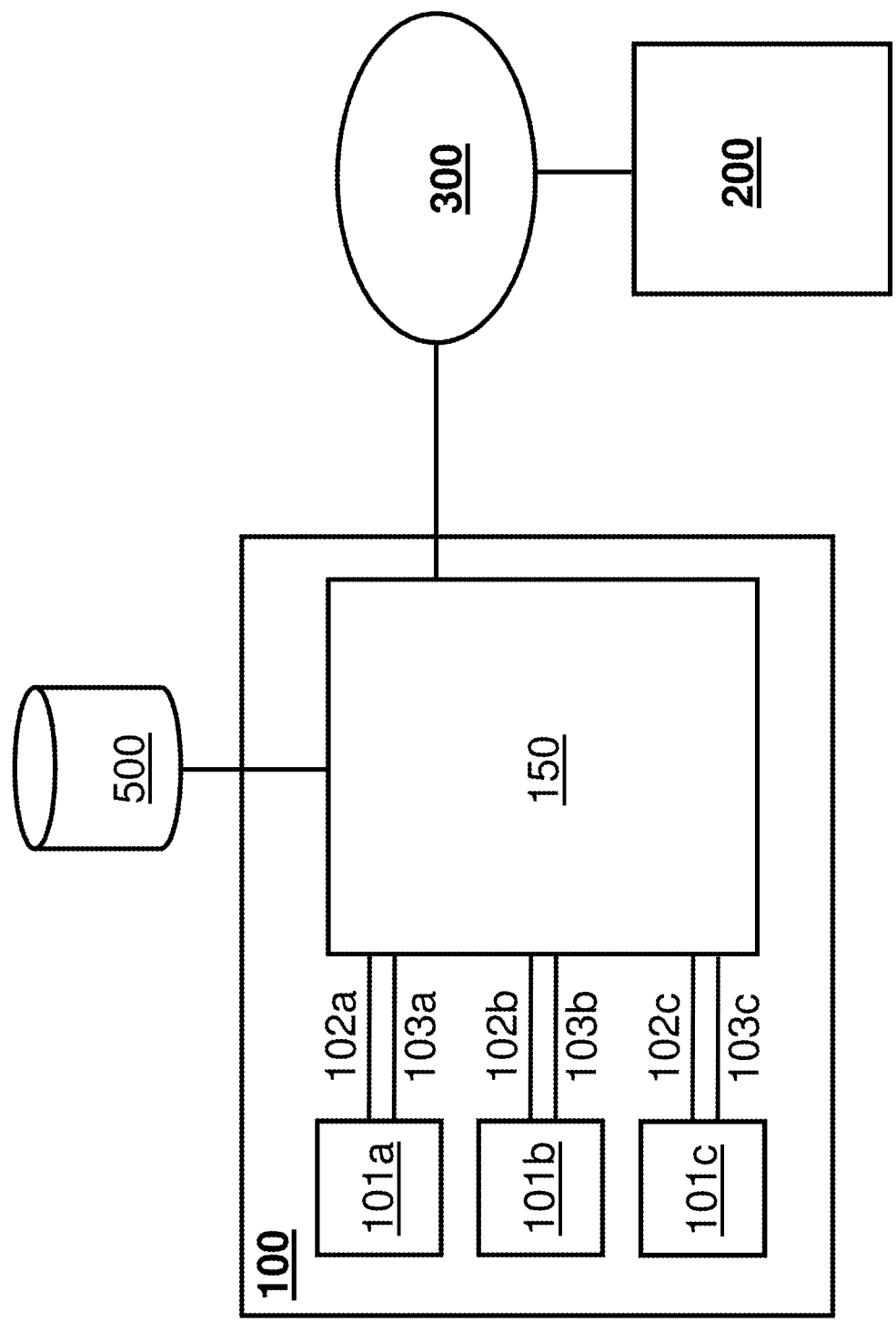
FIG. 2 is a further schematic diagram of a first and second computer system according to an embodiment, showing additional detail to that of FIG. 1, including a control connection to power-up or reset the logic blocks.

FIG. 2 illustrates an embodiment in which the IaaS computer system 100 further comprises control connections 103*a*; 103*b*; 103*c*.

As can be seen, the IaaS computer system 100 of FIG. 2 includes the same components, connections and interfaces as the IaaS computer system 100 of FIG. 1, but further includes control connections 103*a*; 103*b*; 103*c* which connect the logic blocks 101*a*; 101*b*; 101*c* to the interface controller 150. The interface controller 150 can use the control connections 103*a*; 103*b*; 103*c* to power-up the respective logic block 101*a*; 101*b*; 101*c*, power-down the respective logic blocks, or to reset the respective logic blocks. In particular, the control connections 103*a*; 103*b*; 103*c* allow the interface controller 150 to independently power up the logic blocks from an inactive state, or independently reset the logic blocks.

The term "reset" as used herein includes both a power-cycle of a logic block 101*a*; 101*b*; 101*c* (a sequence of powering down a logic block followed by powering up the logic block), and what may be referred to as a "hardware reset". A hardware reset is a hardware-level method of forcing a logic block to execute its initial boot process without going through a power-down/power-up sequence.

The term "power-up" as used herein refers to powering up a logic block from an inactive, powered down state, where the logic block has been in the inactive state for a relatively long time. It will be appreciated that any time a logic-block is powered-up, the power-up will have been preceded, at some point, by a power-down. However, the term "power-up" is used herein in contrast to a power-cycle reset, where the power-up occurs a relatively short time after the preceding power-down.

Each control connection 103*a*; 103*b*; 103*c* may connect the interface controller 150 to the voltage input pins of one or more integrated circuits which implement its respective logic block 101*a*; 101*b*; 101*c*. In this way, the interface controller 150 can control whether or not voltage is applied to the one or more integrated circuits implementing a logic block 101*a*; 101*b*; 101*c*, and therefore control the power state of the respective logic block 101*a*; 101*b*; 101*c*.

Alternatively or additionally, each control connection 103*a*; 103*b*; 103*c* can connect the interface controller 150 to a hardware reset pin of an integrated circuit implementing its respective logic block 101*a*; 101*b*; 101*c*. Pulling the voltage low on the hardware reset pin and returning the voltage to high will cause the respective logic block 101*a*; 101*b*; 101*c* to reset.

The interface controller 150 may include a Power Management Integrated Circuit (PMIC), not shown in FIG. 2. Where the interface controller includes a PMIC, the control connections 103*a*; 103*b*; 103*c* can connect the PMIC to the voltage input pins and/or the hardware reset pin of the one or more integrated circuits that implement the respective logic blocks 101*a*; 101*b*; 101*c*.

According to some embodiments, the interface controller 150 is configured to use a control connection 103*a*; 103*b*; 103*c* to power-up or reset a respective logic block 101*a*; 101*b*; 101*c* in response to receiving an instruction from the management computer system 200, in order prepare the respective logic block 101*a*; 101*b*; 101*c* for use by a different customer of the IaaS system 100. Software processes running on a logic block prior to the power-up or reset do not survive the power-up or reset, so this has the effect of flushing the logic block prior to its use by a new customer, which helps isolate different customers across points in time.

In these embodiments, the management computer system 200 may instruct the interface controller 150 to take the following steps in order to prepare a logic block 101*a*; 101*b*; 101*c* for use by a different customer (customer B):

i. Temporarily stop proxying read and write requests from the logic block to the shared storage facility;
ii. Reset of the logic block using the respective control connection; and
iii. Respond to subsequent read and write requests from the logic block such that it can only read from and write to storage locations of the shared storage facility which are allocated to customer B.

As will be understood from the above description of FIG. 1, step 3 may involve the interface controller 150 translating arbitrary, predefined storage locations specified by the logic block into storage locations that customer B is permitted to use. The arbitrary, predefined storage locations may be provided by the hardwired circuitry of the logic blocks 101*a*; 101*b*; 101*c*, or be stored in the ROM of the logic blocks 101*a*; 101*b*; 101*c*.

Alternatively, after the reset of a logic block, the interface controller 150 may provide the logic block with the storage locations that the user of the logic block (as identified by the management computer system 200) is permitted to use, and may subsequently verify the storage locations specified by the logic block in its read and write requests. In these embodiments, the hardwired circuitry of the logic blocks 101*a*; 101*b*; 101*c* or instructions stored in their ROM may cause the logic blocks 101*a*; 101*b*; 101*c* to seek storage locations from the interface controller 150 over their dedicated physical interfaces 102*a*; 102*b*; 102*c* upon power-up or reset.

Preferably, the logic blocks 101*a*; 101*b*; 101*c* are logically hardwired to seek boot instructions from the interface controller 150 over their respective dedicated physical interfaces 102*a*; 102*b*; 102*c* immediately upon power-up or reset of the logic blocks 101*a*; 101*b*; 101*c*. In this way, the interface controller 150 has control over the boot instructions executed by the logic blocks 101*a*; 101*b*; 101*c* when the current user of a logic block is changed. As will be explained in more detail below with reference to FIG. 3, this can be used to place a logic block in a "known good" state which results from the execution of boot instructions that are known to be "clean", and/or to provide a logic block with user-specific boot instructions according to the user of the logic block that is identified by the management computer system 200. Regardless, it is important that the boot sequence of the logic blocks 101*a*; 101*b*; 101*c* does not depend on any dedicated persistent storage within a logic block, as this could reduce the level of isolation between users across points in time.

It will be understood that the term "logically hardwired" as used herein refers to various implementations in which the behaviour of a logic block upon power-up or reset cannot be changed by software running on the logic block at a point prior to power-up or reset. Instead, the behaviour can only be changed by accessing the internals of the device. Examples of logically hardwiring functionality includes the use ASICs, PLDs and using software instructions that are stored on a ROM.

It is noted that FIG. 2 shows the management computer system 200 as part of a management network 300 that is connected to the interface controller 150 of the IaaS computer system 100. However, it will be appreciated that this is not necessarily the case and that the management computer system 200 could, for example, be part of the IaaS computer system 100, as described above with reference to FIG. 1.

Figure 3:
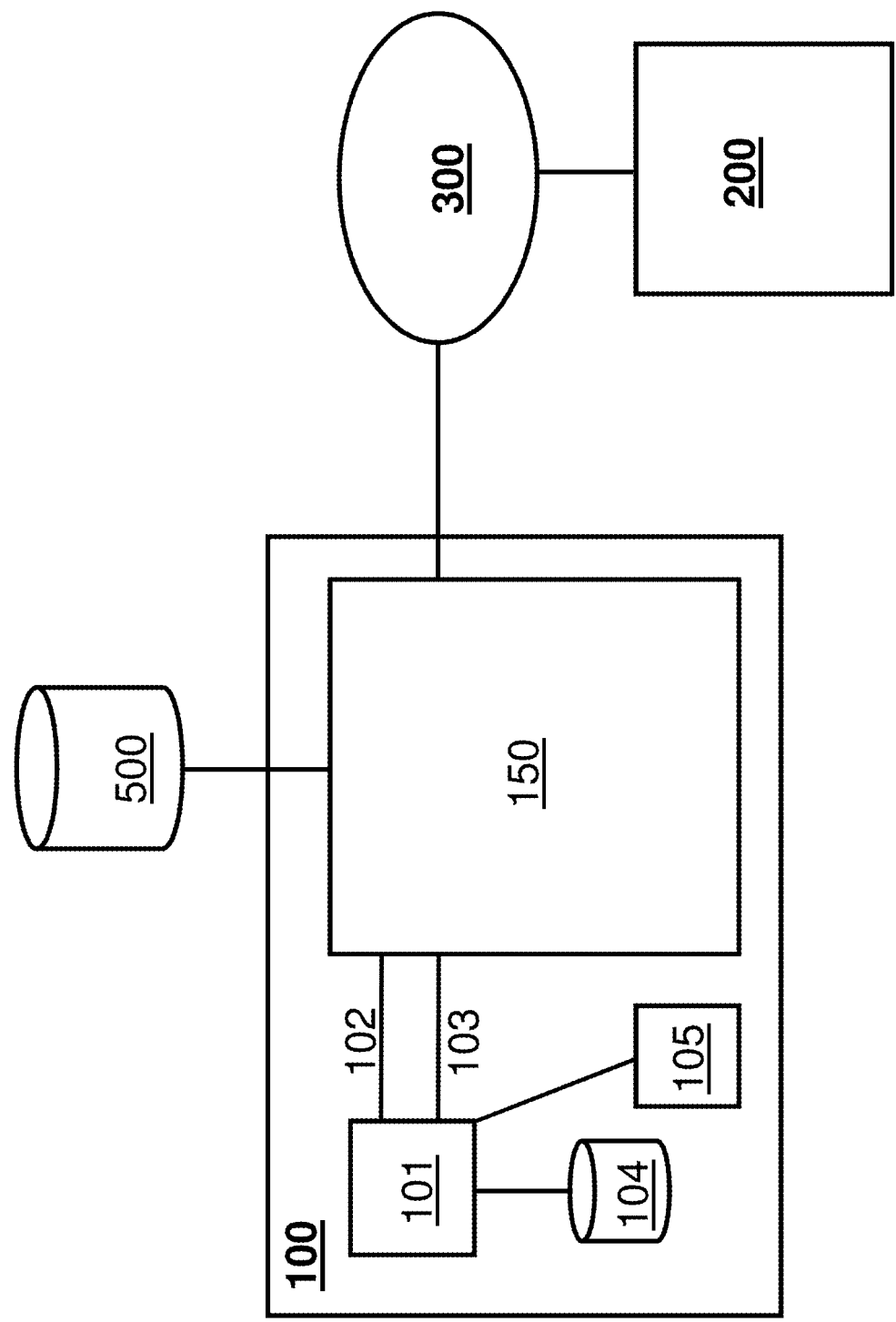
FIG. 3 is a further schematic diagram of a first and second computer system according to an embodiment, in which the logic blocks have their own persistent storage.

FIG. 3 illustrates an embodiment in which a logic block 101 of the IaaS computer system 100 has access to dedicated persistent storage 104 and possibly other peripherals 105. It should be appreciated that although FIG. 3 shows a single logic block 101, this is only for ease of illustration. In any of the embodiments described herein the number of logic blocks may be one or any number more than one.

While providing the logic blocks 101 of the IaaS computer system 100 with their own persistent storage 104 is not essential, it may be desirable in some circumstances because it allows customers to store data more locally during their session of use of the IaaS computer system. This may be more convenient for users, and may also improve the system's performance as read and write requests will typically be completed more quickly if they are made for dedicated persistent storage 104. However, providing a logic block 101 with dedicated persistent storage 104 has the potential to reduce the isolation between customers across points in time. In particular, if customer A uses the logic block 101 at time T1 and writes data to the persistent storage 104, and then customer B uses the logic block 101 at time T2, customer B may be able to access or change customer A's data. Similarly, customer A's processes could persist to time T2 and access Customer B's data. Embodiments allow for the provision of dedicated persistent storage 104 to the logic block 101 while maintaining security separation across points in time.

Firstly, the boot sequence of the logic block 101 should not depend on the provided persistent storage 104. For example, as described above, the logic block 101 may be logically hardwired to seek its boot instructions over the dedicated physical interface 102 upon power-up or reset, thereby removing any dependence on data that may be stored in the persistent storage.

Secondly, steps should be taken to prevent customer B from accessing customer A's data. While this may be achieved by requiring that customers encrypt data that is stored in the persistent storage 104, an alternative approach is to ensure that customer A's data is not recoverable after the use of the logic block 101 is assigned to customer B. In order to achieve this, in one implementation, when the user of the logic block 101 is to be switched from customer A to customer B:

i. The management computer system 200 instructs the interface controller 150 to use the control connection 103 to reset the logic block 101. This causes the logic block 101 to request boot instructions over the dedicated physical interface 102.

ii. The interface controller 150 provides the logic block 101 with boot instructions which, when executed, cause the logic block to overwrite the persistent storage 104 so that customer A's data is no longer recoverable. These boot instructions may be set by the management computer system 200, and the interface controller 150 may provide the instructions by connecting the logic block 101 in a read-only manner to storage that contains the boot instructions.

iii. The management computer system 200 instructs the interface controller 150 to use the control connection 103 to reset the logic block 101. This causes the logic block 101 to request boot instructions over the dedicated physical interface 102. Alternatively, rather than instructing the interface controller 150 to again reset the logic block 101, the instructions provided by the controller 150 in step (ii) above can include a final instruction which, when executed, causes the logic block 101 to seek another set of boot instructions. In other words, the instructions provided by the controller 150 in step (ii) may be a 'bootloader' that causes the logic block 101 to seek the rest of the boot image, provided in step (iv) below, after having overwritten the persistent storage 104 so that customer A's data is no longer recoverable.

iv. The interface controller 150 provides the logic block 101 with boot instructions for operation. These may be user-specific boot instructions that are stored in the shared storage facility 500, in storage locations which customer B is permitted to use. Alternatively, they may be 'clean' boot instructions set by the management computer system 200 so that the logic block 101 is booted to a "known good" state.

In this way, embodiments allow an IaaS computer system that is used by different customers to provide both dedicated and shared persistent storage to users, while maintaining a high degree of isolation between the customers at a given point in time and across points in time.

Figure 4:
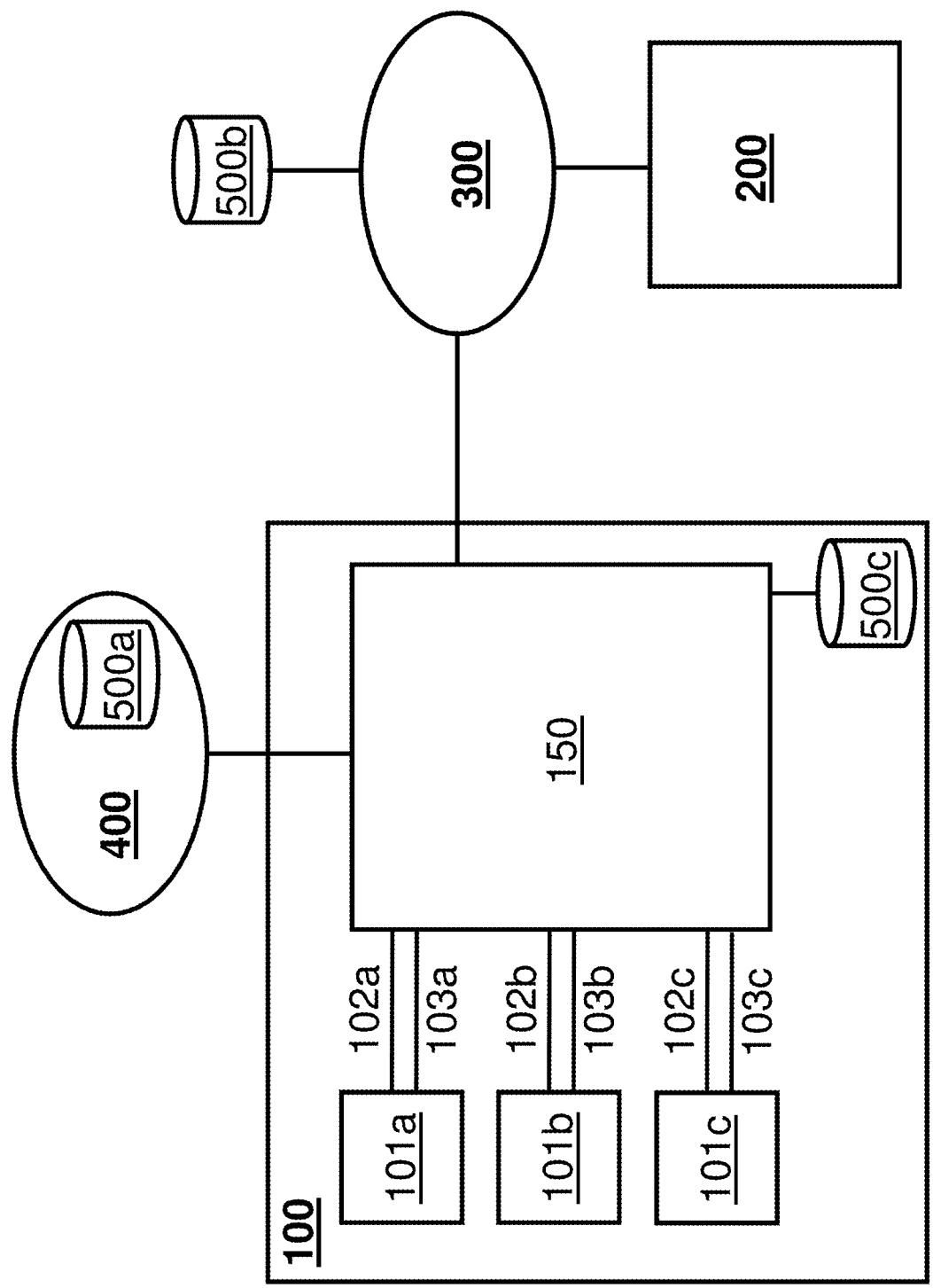
FIG. 4 is a further schematic diagram of a first and second computer system according to an embodiment, in which the interface controller also routes communications to and from the logic blocks via a network.

FIG. 4 illustrates an embodiment in which the IaaS computer system 100 is connected to a network 400, such as the Internet, via a network interface of the interface controller 150.

In addition to serving requests to read data from and write data to the shared storage resources, as described above, the interface controller 150 may be responsible for routing communications between the logic blocks 101a; 101b; 101c to any other computer that is outside of the IaaS computer system 100 via the network 400.

In order to achieve this, the IaaS computer system may further comprise another dedicated physical interface (not shown) between each logic block 101a; 101b; 101c and the interface controller. The logic blocks 101a; 101b; 101c may then send and receive network data (such a network data packets) to and from the interface controller 150 over this additional dedicated physical interface according to an appropriate protocol. Alternatively, the logic blocks 101a; 101b; 101c may send and receive network data over the same interface over which they issue requests to read from and write to storage, i.e. the dedicated physical interfaces 102a; 102b; 102c. This can be done by multiplexing two different protocols (one for storage, one for network data) over the same physical interface 102a; 102b; 102c, for example using time division multiplexing. Alternatively, it can be done by tunnelling a storage protocol via a network protocol (e.g. using iSCSI) or by tunnelling a network protocol via a storage protocol (e.g. using SDIO).

The interface controller 150 will typically send network data to and from the logic blocks 101a; 101b; 101c using a relatively simple protocol in order to reduce the risk of controller being compromised by communications with the logic blocks 101a; 101b; 101c. However, communications between the network interface of the interface controller 150 and the network 400 may use higher level protocols such as HTTP.

The interface controller 150 may also enforce network access rules on network communications that the logic blocks 101a; 101b; 101c send and receive via the interface network controller, including user-specific network access rules based on the identity of the current user of the logic blocks (as identified by the management computer system 200). For example, customer A might request that only TCP communications destined for port 22 and originating from a particular IP address are forwarded to the logic block, while customer B might request that TCP communications for port 80 are forwarded to the logic block independent of the source address. The interface controller 150 may be configured with these user-specific rules, possibly by the management computer system 200, at a point prior to use. Additionally or alternatively, the management computer system 200 may provide the interface controller 150 with the user-specific rules at the time it informs the interface controller of the identity of the current/new user of a logic block.

It is noted that while FIG. 4 does not show dedicated persistent storage or other peripherals connected to the logic blocks 101a; 101b; 101c, this is merely for ease of illustration. Dedicated persistent storage 104 may be present in any of the embodiments described herein.

It is also noted that FIG. 4 illustrates that the shared storage 500 described above with reference to FIGS. 1-3 may actually take the form of one or more shared storage devices 500a; 500b; 500c, and they may be located anywhere relative to the system as long as they can only be accessed by the logic blocks 101a; 101b; 101c via the interface controller 150. For example, the shared storage may include network attached storage (NAS) 500a, storage 500b that is part of the management network 300 and storage 500c that is part of the IaaS computer system 100.

Described above are a number of embodiments with various optional features. It should be appreciated that, with the exception of any mutually exclusive features, any combination of one or more of the optional features are possible.

The invention claimed is:

1. A computer system for use in a server system that provides computing resources to multiple different users, the computer system comprising a logic block, a controller, and a first interface between the logic block and the controller,
   wherein the logic block comprises one or more processing units that execute instructions, the logic block configured to issue requests over the first interface to read from and write to storage; and
   wherein the controller is configured to:
      implement a first communications link between the controller and storage;
      implement a second communications link between the controller and a second computer system and to receive, via the second communications link, information from the second computer system, the information identifying a current user of the logic block; and
      receive the requests from the logic block over the first interface to read from and write to storage, and to complete the requests using the first communications link;
   wherein the first interface is a dedicated physical interface between the logic block and the controller, whereby the controller can determine that communications over the first interface are communications with the logic block; and
   wherein the controller is configured to complete the requests to read from and write to storage using one or more storage locations of the storage that the current user of the logic block identified by the second computer system is permitted to use.

2. The computer system of claim 1, wherein the controller is configured to, in response to receiving information from the second computer system identifying a subsequent user of the logic block, complete the requests from the logic block to read from and write to storage using one or more predefined storage locations of the storage that the subsequent user of the logic block is permitted to use.

3. The computer system of claim 1, further comprising a control connection between the logic block and the controller, wherein the controller is configured to use the control connection to power-up or reset the logic block in response to receiving instructions to power-up or reset the logic block from the second computer system or in response to receiving an instruction from the second computer system to configure the logic block for use by a subsequent user of the logic block, wherein the instruction to configure the logic block for use by a subsequent user comprises either information identifying the subsequent user of the logic block or an instruction for the controller to stop communicating requests to read from and write to storage from the logic block to storage, prior to resetting the logic block.

4. The computer system of claim 1, wherein the logic block is configured to specify one or more predefined storage locations when it issues requests to read from and write to storage over the first interface, and wherein the controller is configured to translate the predefined storage location specified by the logic block to a user-specific storage location that the user of the logic block identified by the second computer system is permitted to use, and to complete the requests using the user-specific storage location.

5. The computer system of claim 4, wherein the logic block is logically hardwired to specify the one or more predefined storage locations when it issues requests to read from and write to storage.

6. The computer system of claim 1, wherein the controller is configured to provide the logic block with user-specific storage locations that the current user of the logic block identified by the second computer system is permitted to use, and wherein the logic block is configured to specify the user-specific storage locations when it issues requests to read from and write to storage, wherein the controller is further configured to verify that the storage locations specified by the logic block match the user-specific storage locations associated with the current user of the logic block identified by the second computer system, wherein the logic block is configured to request the user-specific storage locations it is permitted to use from the controller upon power-up or reset of the logic block, wherein the logic block is logically hardwired to request the user-specific storage locations it is permitted to use from the controller upon power-up or reset of the logic block.

7. The computer system of claim 1, wherein the controller comprises a network interface for communicating with a network, and wherein the controller is configured to send network data received from the network via the network interface to the logic block over the first interface and to send network data received from the logic block over the first interface to the network via the network interface.

8. The computer system of claim 7, wherein the controller is configured to impose predefined user-specific network access rules on the network data sent to and received from the logic block over the first interface according to the current user of the logic block identified by the second computer system.

9. The computer system of claim 7, wherein the logic block is configured to issue the requests to read from and write to storage over the first interface according to a first communication protocol, and wherein the logic block is configured to send and receive network data over the first interface according to a second communication protocol, wherein: the first and second communication protocols are multiplexed over the first interface, or the first communication protocol is tunnelled via the second communication protocol, or the second communication protocol is tunnelled via the first communication protocol.

10. The computer system of claim 7, wherein the storage comprises network-based storage, and wherein the controller is configured to complete the requests to read from and write to storage using the network-based storage over the network interface.

11. The computer system of claim 1, wherein the logic block is configured to request boot instructions from the controller over the first interface upon power-up or reset of the logic block, wherein the logic block is logically hard-wired to request boot instructions from the controller upon power-up or reset of the logic block.

12. The computer system of claim 11, wherein the controller is configured to, in response to receiving the request for boot instructions from the logic block: i) to complete the request using one or more predefined storage locations of the storage that the current user of the logic block identified by the second computer system is permitted to use, in order to provide user-specific boot instructions to the logic block, or ii) provide predefined boot instructions provided by the second computer system to the logic block.

13. The computer system of claim 1, wherein the logic block further comprises its own persistent storage, and the computer system further comprises a control connection between the logic block and the controller, wherein the controller is configured to use the control connection to power-up or reset the logic block, and wherein the controller is configured, in response to receiving an instruction from the second computer system to configure the logic block for use by a subsequent user, to:
    power-up or reset the logic block so that the logic block requests boot instructions from the controller;
    provide predefined boot instructions provided by the second computer system to the logic block, the predefined boot instructions comprising instructions that cause the logic block to overwrite the logic block's own persistent storage so that the contents of the logic block's own persistent storage are no longer recoverable by the logic block;
    reset the logic block so that the logic block requests boot instructions from the controller; and
    complete the request to read from or write to storage using one or more predefined storage locations of the storage that the current user of the logic block identified by the second computer system is permitted to use, in order to provide user-specific boot instructions to the logic block.

14. The computer system of claim 1, wherein the logic block further comprises its own persistent storage, and the computer system further comprises a control connection between the logic block and the controller, wherein the controller is configured to use the control connection to power-up or reset the logic block, and wherein the controller is configured, in response to receiving an instruction from the second computer system to configure the logic block for use by a subsequent user, to:
    power-up or reset the logic block so that the logic block requests boot instructions from the controller;
    provide predefined boot instructions provided by the second computer system to the logic block, the predefined boot instructions comprising instructions that cause the logic block to overwrite the logic block's own persistent storage so that the contents of the logic block's own persistent storage are no longer recoverable by the logic block, and that further cause the logic block to request a further set of boot instructions from the controller;
    complete the request to read from or write to storage using one or more predefined storage locations of the storage that the current user of the logic block identified by the second computer system is permitted to use, in order to provide user-specific boot instructions to the logic block.

15. The computer system of claim 1, wherein the controller is implemented using formally verifiable software or is implemented in hardware, such as using an FGPA or ASIC.

16. The computer system of claim 1, wherein the logic block has no interfaces to outside of the computer system except via the controller.

17. The computer system of claim 1, wherein the storage comprises one or more of:
    one or more storage media accessible via a network interface of the controller;
    one or more storage media accessible via the second communications link second computer system; and
    one or more storage media within the computer system.

18. The computer system of claim 1, further comprising one or more additional logic blocks, each comprising one or more processing units that execute instructions,
    wherein each of the additional logic blocks is configured to issue requests to read from and write to the storage over a respective dedicated physical interface between the respective logic block and the controller, whereby the controller can determine with which logic block it is communicating;
    wherein the controller is further configured, for the additional logic blocks, to:
        receive information identifying a current user of the respective additional logic block from the second computer system; and
        receive requests to read from and write to storage from the respective additional logic block and to complete the respective requests using respective predefined storage locations of the storage that the current user of the respective logic block identified by the second computer system is permitted to use.

19. The computer system of claim 1, further comprising the second computer system, wherein the second computer system is configured to provide the controller with the storage locations that each of a plurality of different users of the computer system are permitted to use.

20. A method of operating a computer system, the computer system comprising a controller, a logic block, and a first interface between the controller and the logic block, the logic block comprising one or more processing units that execute instructions, the method comprising:
    receiving, by the controller, from a second computer system, information identifying a current user of the logic block;

receiving, by the controller, from the logic block, over the first interface, requests to read from and write to storage, the first interface being a dedicated physical interface between the logic block and the controller whereby the controller can determine that communications over the first interface are communications with the logic block; and completing the requests to read from and write to storage using one or more storage locations of the storage that the current user of the logic block identified by the second computer system is permitted to use.

21. The computer system of claim 1, wherein the dedicated physical interface is a point-to-point interface between the logic block and the controller.

* * * * *